US012562066B2

(12) United States Patent
Sajjan et al.

(10) Patent No.: US 12,562,066 B2
(45) Date of Patent: Feb. 24, 2026

(54) SYSTEM AND METHOD FOR ENHANCING PILOT SITUATIONAL AWARENESS FOR HYBRID APPROACH PROCEDURE SETS

(71) Applicant: Rockwell Collins, Inc., Cedar Rapids, IA (US)

(72) Inventors: Sharanabasappa Sajjan, Kalaburagi (IN); Dinesh Kumar Kushwaha, Bangalore (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 178 days.

(21) Appl. No.: 18/218,255

(22) Filed: Jul. 5, 2023

(65) Prior Publication Data

US 2024/0177616 A1     May 30, 2024

(51) Int. Cl.
| | |
|---|---|
| *G08G 5/30* | (2025.01) |
| *B64D 43/00* | (2006.01) |
| *G08G 5/21* | (2025.01) |

(52) U.S. Cl.
CPC .............. *G08G 5/30* (2025.01); *B64D 43/00* (2013.01); *G08G 5/21* (2025.01)

(58) Field of Classification Search
CPC . B64D 43/00; G08G 5/30; G08G 5/21; G08G 5/26; G08G 5/54
See application file for complete search history.

(56) References Cited

U.S. PATENT DOCUMENTS

| | | | |
|---|---|---|---|
| 9,611,053 B2 | 4/2017 | Canale et al. | |
| 9,922,570 B2 | 3/2018 | Stark | |

| | | | |
|---|---|---|---|
| 10,140,873 B2 | 11/2018 | Adler et al. | |
| 10,339,817 B1 * | 7/2019 | McGaughy | G08G 5/54 |
| 11,074,447 B1 * | 7/2021 | Fox | G08G 5/55 |
| 11,417,220 B2 * | 8/2022 | Holder | G08G 5/55 |
| 12,230,069 B2 * | 2/2025 | Moeykens | G06F 21/32 |

(Continued)

FOREIGN PATENT DOCUMENTS

| | | | | |
|---|---|---|---|---|
| EP | 1322915 B1 * | 4/2008 | .......... | G01C 23/005 |
| EP | 2717018 B1 | 11/2018 | | |

OTHER PUBLICATIONS

Extended European Search Report dated Mar. 27, 2024; European Application No. 23213128.4.

*Primary Examiner* — Kyle T Johnson
(74) *Attorney, Agent, or Firm* — Suiter Swantz IP

(57)     ABSTRACT

A system and method for enhancing pilot situational awareness stores to an onboard navigational database hybrid approach procedure sets, e.g., approaches to a landing or other waypoint wherein a first portion of the approach is performed or executed according to a first approach procedure set (e.g., to a final approach fix (FAF) or other waypoint), and a second portion of the approach (e.g., once the FAF/waypoint is sequenced) is performed/executed according to a different approach procedure set, e.g., an RNP AR-to-LPV hybrid approach. Flight displays provide textual approach indicators, e.g., when the hybrid approach is loaded and arming of the first segment is upcoming, or when the first and second segments are respectively armed and activated (e.g., when the necessary conditions are satisfied). Hybrid approach indicators may alternatively or additionally be provided via flight mode annunciators (FMA) of the flight display.

20 Claims, 5 Drawing Sheets

100 ⟶

(56)            References Cited

U.S. PATENT DOCUMENTS

| | | | |
|---|---|---|---|
| 2006/0253232 A1* | 11/2006 | Gerrity | G08G 5/54 |
| | | | 701/16 |
| 2009/0024261 A1* | 1/2009 | Rouquette | G08G 5/21 |
| | | | 701/16 |
| 2011/0035082 A1 | 2/2011 | Loots et al. | |
| 2011/0106345 A1* | 5/2011 | Takacs | G08G 5/54 |
| | | | 701/16 |
| 2011/0144832 A1 | 6/2011 | McDowell et al. | |
| 2012/0065817 A1 | 3/2012 | Takacs et al. | |
| 2014/0350755 A1* | 11/2014 | Caillaud | G01C 23/00 |
| | | | 701/18 |
| 2015/0005992 A1* | 1/2015 | Coulmeau | G05D 1/0676 |
| | | | 701/16 |
| 2017/0158349 A1* | 6/2017 | Scacchi | G08G 5/54 |
| 2017/0349295 A1* | 12/2017 | Pepitone | G08G 5/30 |
| 2018/0010916 A1* | 1/2018 | Roger | G01C 21/20 |
| 2018/0061246 A1 | 3/2018 | Adler et al. | |
| 2018/0082593 A1* | 3/2018 | Judd | G08G 5/58 |
| 2018/0130363 A1* | 5/2018 | Yvetot | G08G 5/32 |
| 2020/0168104 A1* | 5/2020 | Holder | G08G 5/55 |
| 2020/0273353 A1* | 8/2020 | O'Connell | G02B 30/56 |
| 2021/0221530 A1 | 7/2021 | Venkataramana et al. | |
| 2022/0044576 A1* | 2/2022 | Songa | B64D 43/02 |
| 2024/0177616 A1* | 5/2024 | Sajjan | B64D 43/00 |

* cited by examiner

FMS 102

PROCESSOR 106

FLIGHT DISPLAYS 108

MEMORY 104

FLIGHT PLAN 110

NAV DB 112

APPROACHES 114

HYBRID APP. 116

100

LPV
Arm Radius
216

212

202

B
(FAF)

C

208

210

A

206

204

RNP AR
Arm Radius
214

100

200

108

310

312

312

COM1
A XXX.XXX
B XXX.XXX

COM2
A XXX.XXX
B XXX.XXX

308

306

314

XXX XXX
XXX XXX
XXXX
XXXXXX
XXX XXX

316

RNP AR ARM

XXX

314

XXXX
XXXX
XXX XXX

XXX XXX
XXX
XXX

304

302

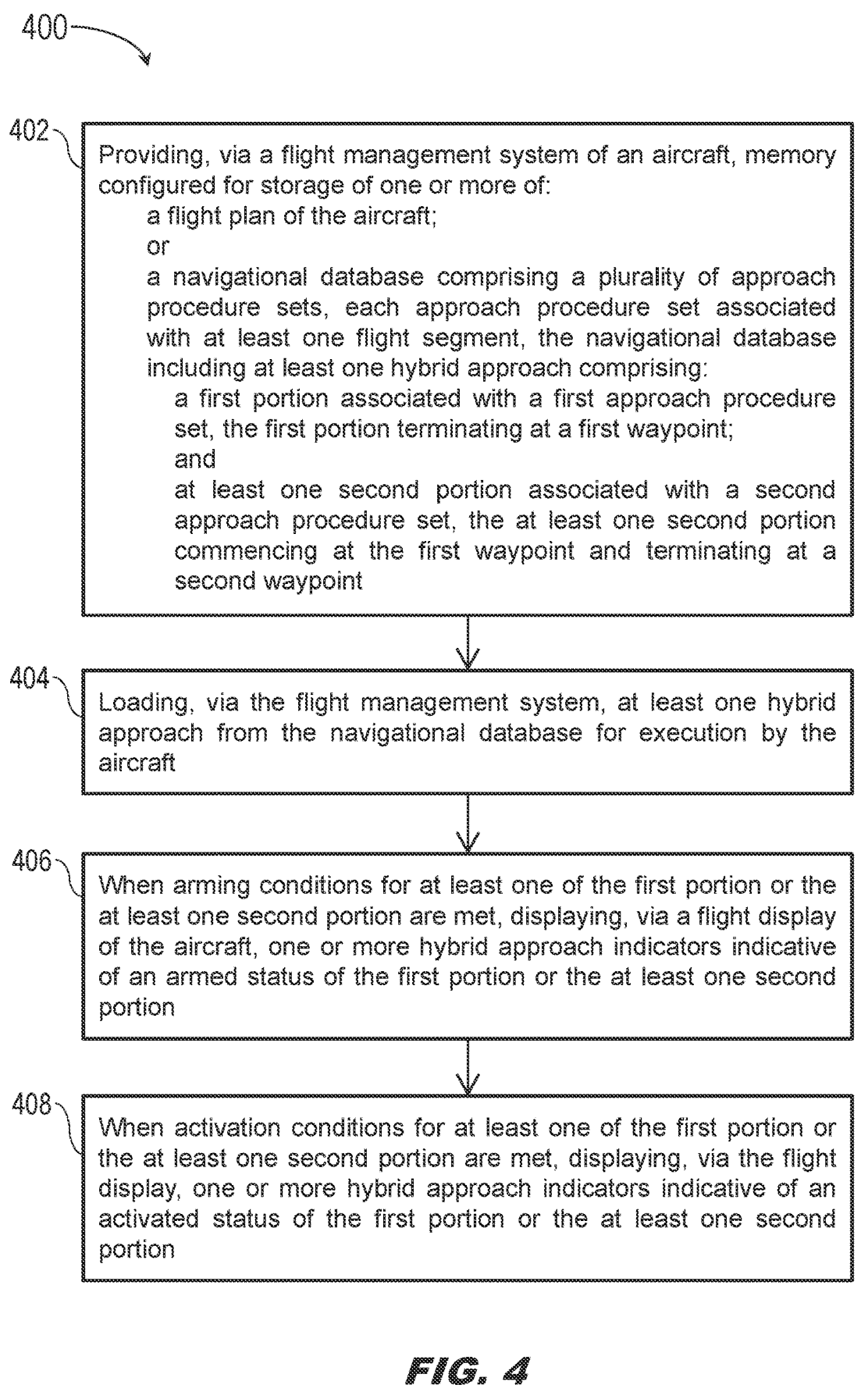

400

402

Providing, via a flight management system of an aircraft, memory configured for storage of one or more of:

a flight plan of the aircraft;

or a navigational database comprising a plurality of approach procedure sets, each approach procedure set associated with at least one flight segment, the navigational database including at least one hybrid approach comprising:

a first portion associated with a first approach procedure set, the first portion terminating at a first waypoint; and at least one second portion associated with a second approach procedure set, the at least one second portion commencing at the first waypoint and terminating at a second waypoint

404

Loading, via the flight management system, at least one hybrid approach from the navigational database for execution by the aircraft

406

When arming conditions for at least one of the first portion or the at least one second portion are met, displaying, via a flight display of the aircraft, one or more hybrid approach indicators indicative of an armed status of the first portion or the at least one second portion

408

When activation conditions for at least one of the first portion or the at least one second portion are met, displaying, via the flight display, one or more hybrid approach indicators indicative of an activated status of the first portion or the at least one second portion

*FIG. 4*

SYSTEM AND METHOD FOR ENHANCING PILOT SITUATIONAL AWARENESS FOR HYBRID APPROACH PROCEDURE SETS

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

Indian Provisional Patent Application No. 202211068713 filed Nov. 29, 2022 relating to SYSTEM AND METHOD FOR ENHANCING PILOT SITUATIONAL AWARENESS FOR HYBRID APPROACH PROCEDURE SETS.

Said Indian Provisional Patent Application No. 202211068713 is herein incorporated by reference in its entirety.

BACKGROUND

Published approaches, or instrument approaches, are predetermined procedure sets governing the transfer of an aircraft inflight from instrument flight rules (IFR), where navigation of the aircraft is achieved with reference to electronic navigational signals, to a safe landing at a destination airport (or, in some cases, to a point from which said landing may be accomplished via visual flight rules (VFR)). Published approaches are generally specific to a particular destination airport and to approach procedures as maintained by the country wherein the airport is located. Published approach charts, or approach plates, for a given airport provide pilots with reference to specific approach procedures and procedure sets in use at that airport. An approach may comprise a sequence of segments, via which the aircraft may align with subsequent segments (or with a runway) or in turn, all while descending and maintaining protection from obstacles or other air traffic proximate to the airport.

The ability of a particular aircraft to execute an approach procedure may depend on the capability of instruments aboard the aircraft to communicate with navigation and landing systems on the ground. For example, precision approaches (PA) may provide both lateral (e.g., course) and vertical (e.g., glidepath) guidance to aircraft, while nonprecision approaches (NPA) may provide lateral guidance but not vertical guidance. Specific approach procedures may be tied to a particular navigation system (navigational aid, NAVAID) for use with a given procedure.

Hybrid approaches may provide additional protection for landings in mountainous or otherwise difficult terrain, or render such landings more accessible to smaller aircraft with less sophisticated navigational equipment than may be found on larger commercial airships. For example, a Required Navigational Performance with Authorization Required (RNP-AR) procedure as defined in United States Federal Aviation Administration (FAA) Advisory Circular 90-101A may be preferred at a given airport, but RNP-AR may require advanced navigational systems, aircraft certifications, and flight crew training standard for commercial airlines but not available for business jets or other general aviation craft.

Accordingly, an RNP-to-LPV (Localizer Performance with Vertical Guidance) hybrid approach may connect initial and intermediate segments executed according to RNP with final segments executed according to LPV. However, while conventional flight management systems (FMS) may indicate a status of a currently executing approach procedure, they are not designed to provide situational awareness for hybrid approaches.

SUMMARY

In a first aspect, a flight management system (FMS) is disclosed. In embodiments, the FMS includes a memory for storing a flight plan and a navigational database for storing approach procedure sets (e.g., for use on approach to landing at a specific airport, on a specific runway, or to a decision altitude or waypoint from which an approach procedure may commence). Each approach procedure includes one or more segments, e.g., each segment connecting a pair of waypoints between which an aircraft may maneuver according to a particular approach procedure set. Hybrid approaches stored to the navigational database include a first portion executed according to one approach procedure set and a second portion (e.g., each portion including one or more segments, each segment and the first and second portions connected by a waypoint) executed according to a different procedure set; for example, an RNP AR-to-LPV hybrid approach includes a first portion executed according to Required Navigational Performance with Authorization Required (RNP AR) approach procedures and a second portion (e.g., the first portion terminated by, and the second portion commenced by, sequencing of a waypoint) executed according to Localizer Performance with Vertical Guidance (LPV) approach procedures. The FMS loads hybrid approaches for execution and provides hybrid approach indicators via the flight displays to provide situational awareness associated with hybrid approaches. For example, hybrid approach indicators may indicate to the pilot or crew: that a hybrid approach has been loaded, and that arming of its first portion is imminent; that the first portion of the hybrid approach has been armed (e.g., all necessary conditions have been met for arming); that the first portion is active (e.g., necessary conditions for activation have been met); that the second portion is soon to be armed, or is armed; that the second portion is activated.

In some embodiments, hybrid approach indicators are presented as textual indicators.

In some embodiments, hybrid approach indicators use different colors to indicate activated and armed statuses of the first or second portion (e.g., an activated status of the first portion vs. an armed status of the second portion).

In some embodiments, hybrid approach indicators use different colors to indicate the first and second portions.

In some embodiments, hybrid approach indicators indicate a missed approach associated with the hybrid approach, e.g., with the first and/or the second portion.

In some embodiments, hybrid approach indicators indicate an upcoming-armed status (i.e., hybrid approach loaded, arming imminent, but necessary conditions for arming not yet achieved) associated with the first or second portion.

In some embodiments, hybrid approach indicators are presented via a primary flight display (PFD).

In some embodiments, hybrid approach indicators are presented via a flight mode annunciator (FMA) of the PFD.

In a further aspect, a method for enhancing situational awareness of the pilot/crew in associated with the loading and execution of hybrid approach procedure sets is disclosed. In embodiments, the method includes providing a memory for storage of a flight plan and a navigational database including approach procedure sets and hybrid approach procedure sets, e.g., wherein a first portion of the approach is executed according to a first approach procedure set and a second portion of the approach (e.g., once a final approach fix or like waypoint is sequenced). The method includes loading a hybrid approach via the flight management system (FMS). The method includes, when necessary conditions for arming the first or second portion of the hybrid approach are satisfied, providing a hybrid approach indicator of the armed status via a flight display. The method includes, when necessary conditions for activating the first or second portion of the hybrid approach are satisfied, providing a hybrid approach indicator of the activated status via the flight display.

In some embodiments, the method includes providing the hybrid approach indicators as textual indicators.

In some embodiments, the method includes providing hybrid approach indicators simultaneously indicative of an activated status (e.g., of the first portion) and an armed status (e.g., of the second portion), the activated status represented via a first color and the armed status represented via a second color.

In some embodiments, the method includes providing hybrid approach indicators simultaneously indicative of the first portion and the second portion, the first portion represented via a first color and the second portion represented via a second color.

In some embodiments, the method includes providing hybrid approach indicators indicative of a hybrid approach resulting in a missed approach.

In some embodiments, the method includes providing hybrid approach indicators indicative of an upcoming-armed status of the first or second portion, e.g., that said portion is loaded, but that the necessary conditions for arming are not yet satisfied.

In some embodiments, the method includes providing hybrid approach indicators via the primary flight display (PFD).

In some embodiments, the method includes providing hybrid approach indicators via a flight mode annunciator (FMA) of the PFD.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

and FIG. 4 is a flow diagram illustrating a method for flight management according to example embodiments of this disclosure.

DETAILED DESCRIPTION

Figure 1:
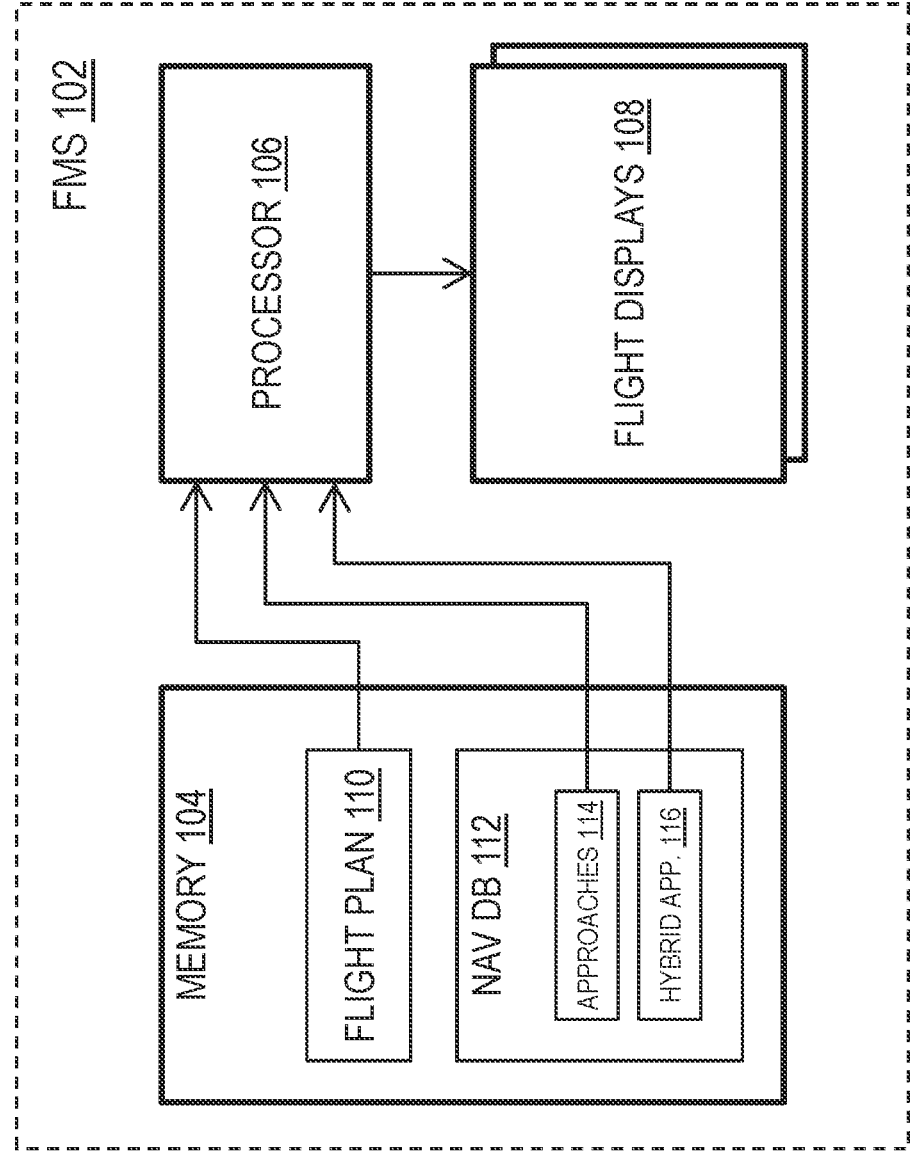
FIG. 1 is a block diagram illustrating a flight management system (FMS) configured to provide situational awareness for hybrid approaches according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a system and method for providing enhanced situational awareness of hybrid approaches. For example, once a hybrid approach is loaded for execution, the aircraft flight management system (FMS) will track the status of each portion or segment of the hybrid approach and display this status to the pilot or crew via cockpit flight displays in real time or near real time.

Referring to FIG. 1, an aircraft 100 is disclosed. The aircraft 100 may include a flight management system 102 (FMS) comprising memory 104 (e.g., or any other appropriate data storage), processors 106, and flight display/s 108.

In embodiments, the FMS 102 may be in communication with controls, systems, and/or subsystems of the aircraft 100, providing control input from a pilot (e.g., operator, crewmember) to specific controls and systems of the aircraft and providing situational awareness to the pilot via feedback from aircraft controls and systems. For example, the pilot may execute the current flight plan 110 via the FMS 102 by adjusting throttles, control surfaces, and other gear aboard the aircraft while maintaining communications with appropriate ground control facilities and/or other air traffic. Similarly, navigational systems aboard the aircraft 100 may provide (e.g., via flight displays 108 including a navigational display) the pilot with precise and real-time information as to the position of the aircraft (e.g., relative to the current point in the flight plan 110, relative to other air traffic, relative to other obstacles and terrain, relative to the destination airport). Additionally, the flight displays 108 may include a primary flight display (PFD) for real-time airspeed, altitude, and heading information (in addition to other system/subsystem statuses). In some embodiments, the flight display 108 may include multi-function displays (MFD), navigational displays, or any other appropriate cockpit displays for presenting flight information to the pilot or crew.

In embodiments, the memory 104 may store, in addition to the flight plan 110, a navigational database 112 including any published approaches 114 and/or hybrid approaches 116 available through the flight plan 110. For example, the flight plan 110 may include a single flight or several legs, each leg involving a stop at an intermediate airport, prior to arrival at the destination airport. Published approaches 114 and hybrid approaches 116 for any intermediate airport in the flight plan 110, as well as the destination airport, may be loaded to the FMS 102.

In embodiments, when the aircraft 100 nears an intermediate airport, or the destination airport, the FMS 102 may load an appropriate published approach 114 or hybrid approach 116. For example, each hybrid approach 116 may include a first portion comprising one or more initial segments (e.g., or an initial segment plus one or more intermediate segments) connecting an initial waypoint with a first terminal waypoint (e.g., via one or more intermediate waypoints connecting each segment of the first portion), each segment of the first portion executed according to a particular approach procedure set. Further, a second portion (or, e.g., one or more sequential second portions) may comprise a final segment (or sequence of final segments) connecting the first terminal waypoint to a second terminal waypoint (e.g., a landing at the destination airport, a decision altitude from which a VFR landing may be executed), the second portion executed according to a different approach procedure set. In embodiments, the flight displays 108 may provide the pilot with real-time situational awareness as to the current mode or status of a loaded hybrid approach, e.g., whether a first portion or second portion is armed or active.

Figure 2:
FIG. 2 is a diagrammatic illustration of a hybrid approach.

Referring to FIG. 2, a hybrid approach 200 is shown.

In embodiments, the hybrid approach 200 may be an RNP AR-to-LPV approach loaded by the FMS (102, FIG. 1) of the aircraft 100 and executed by the aircraft to land at an assigned runway 202 of a destination airport as provided for by the flight plan (110, FIG. 1). For example, the RNP AR-to-LPV hybrid approach may comprise an A-waypoint 204 associated with a Required Navigational Performance with Authorization Required (RNP AR) portion 206, or a first portion, of the hybrid approach 200. In embodiments, the RNP AR-to-LPV hybrid approach 200 may further comprise B- and C-waypoints 208, 210 associated with a Localizer Performance with Vertical Guidance (LPV) portion 212, or a second portion (e.g., final portion), of the hybrid approach 200. The B-waypoint 208, for example, may be a final approach fix (FAF), or the starting point of the final approach segment toward a landing on the runway 202.

In embodiments, the FMS 102 may, via the flight displays (108, FIG. 1), alert the pilot to changes in status or mode of the loaded hybrid approach 200 and/or its component portions 206, 212. For example, when the aircraft 100 enters an arming radius 214 (e.g., 31 NM/~57.4 km) around the A-waypoint 204, the necessary conditions for arming the RNP AR portion 206 may be met, and the flight displays 108 may indicate that the RNP AR portion is now armed. Further, when the aircraft 100 sequences the A-waypoint 204 (e.g., reaching the A-waypoint via fly-by or fly-over, and preparing for the next waypoint associated with the hybrid approach 200, e.g., the FAF/B-waypoint 208) the necessary conditions may be met for activation of the RNP AR portion 206. Accordingly, the flight displays 108 may indicate to the pilot the activated status of the RNP AR portion 206.

In embodiments, when the necessary conditions are likewise met for arming and activation of the LPV portion 212, the flight displays 108 may likewise provide situational awareness as to the armed or active state of the LPV portion. For example, when the aircraft 100 (e.g., in fulfillment of the RNP AR portion 206) enters an arming radius 216 of the LPV portion 212, the flight displays 108 may indicate the armed status of the LPV portion. (Further, if the RNP AR portion 206 and the LPV portion 212 are simultaneously armed, the flight displays 108 may indicate the armed status of both portions.) In some embodiments, if the hybrid approach 200 (e.g., RNP AR-to-LPV hybrid approach) results in a missed approach (MA; e.g., an RNP AR missed approach), the flight displays 108 may indicate the missed approach.

In embodiments, when the aircraft 100 sequences the FAF/B-waypoint 208, the necessary conditions for activation of the LPV portion 212 may be met, and the FMS 102 may accordingly commence execution of the LPV portion. Accordingly, the flight displays 108 may indicate the activated status of the LPV portion 212 as the aircraft 100 proceeds toward a landing at the runway 202 under LPV.

Figure 3A:
FIGS. 3A through 3C illustrate situational awareness of a hybrid approach as provided by the flight display of FIG. 1 according to example embodiments of this disclosure.

Referring now to FIG. 3A, the flight display 108 is shown.

In embodiments, the flight display 108 may be a primary flight display (PFD), multi-function display (MFD), or other like display as noted above incorporating, e.g., horizontal situation indicator/heading indicator 302, turn indicator 304, airspeed indicator 306, altimeter 308 (which may include a vertical speed indicator), attitude indicator 310, communications (comms) channel indicators 312, and text areas 314 via which textual information may be provided (e.g., systems/subsystems status, wind speed/direction, weather information, true airspeed (TAS), groundspeed (GS). For example, the flight display 108 may display a textual hybrid approach indicator 316 on a dedicated line (e.g., line 1A) of a text area 314, the textual hybrid approach indicator indicative of a current mode or status of the hybrid approach. In embodiments, the textual hybrid approach indicator 316 may indicate an armed status of the RNP AR portion (206, FIG. 2) ("RNP AR ARM").

Figure 3C:
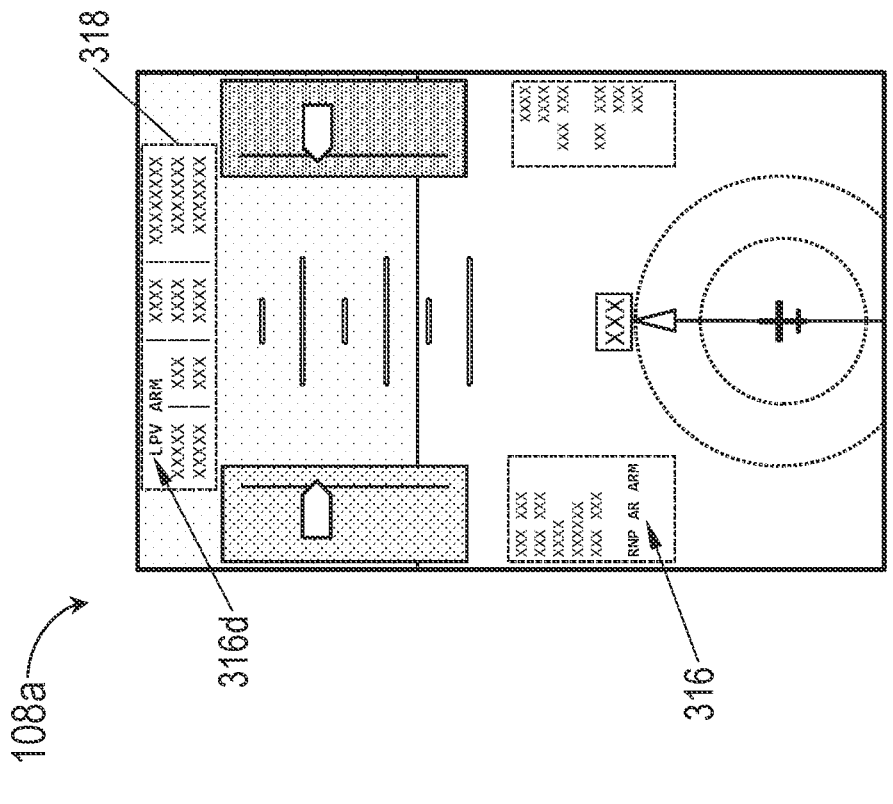
Figure 3B:
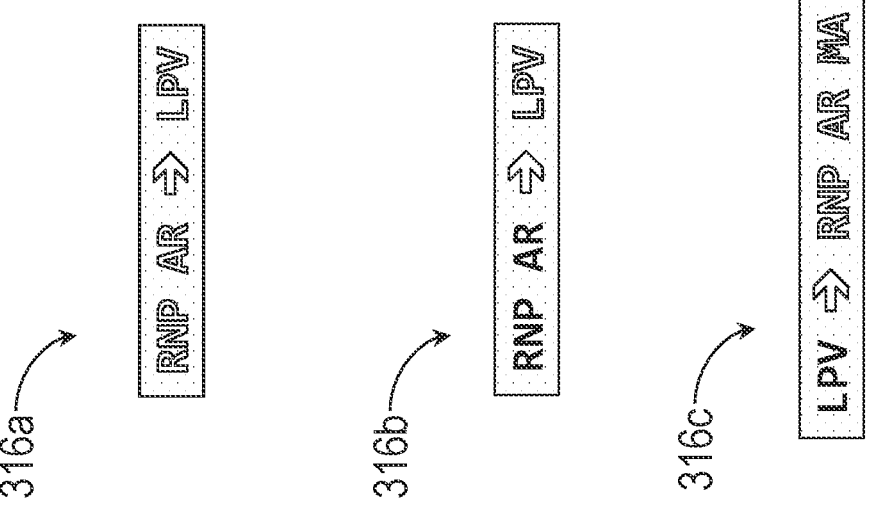

Referring also to FIG. 3B, in embodiments the textual hybrid approach indicators 316a-316c may be implemented similarly to the textual hybrid approach indicator 316 of FIG. 3A, except that the textual hybrid approach indicators 316a-316c may provide a status or mode of multiple portions of the hybrid approach 200. For example, the textual hybrid approach indicator 316a may be displayed via the flight display 108 when the RNP AR portion (206, FIG. 2) is armed and the final approach segment of the hybrid approach 200 is associated with an LPV approach (e.g., the RNP AR-to-LPV approach is loaded and the RNP AR portion is armed, while the LPV status may be upcoming-armed (not yet armed)). Accordingly, the textual hybrid approach indicator 316a may provide status information in a uniform color (e.g., white). Similarly, when necessary conditions are met for activation of the RNP AR portion 206, the activated status of the RNP AR portion and the upcoming-armed status (or armed status, if the LPV portion 212 is armed) may be indicated by the textual hybrid approach indicator 316b by displaying "RNP AR" in a different color (e.g., green) indicative of activated status, while "→LPV" remains in white to indicate armed or upcoming-armed status. In embodiments, if the hybrid approach 200 results in an RNP AR missed approach, e.g., a missed approach incorporating RNP AR segments or portions, the textual hybrid approach indicator 316c may display "LPV" in the "active" color (e.g., green) indicative of activated status of the LPV portion while the missed approach (MA) RNP AR portion is indicated in the first (e.g., white) color (e.g., "RNP AR MA"). For example, once the hybrid approach 200 is attempted and results in the missed approach, the textual hybrid approach indicator 316c may update to indicate the missed approach.

Referring now to FIG. 3C, the flight display 108a may be implemented similarly to the flight display 108 of FIG. 3A, except that the flight display 108a may, in addition to displaying a textual hybrid approach indicator 316 indicative of the armed status of the RNP AR portion 206 (e.g., via the A1 line, in first-color/white text), further display the upcoming-armed status of the LPV portion 212 (e.g., also in first-color/white text) as a textual hybrid approach indicator 316d within the 3-line flight mode annunciator 318 (FMA) at the top of the flight display 108a.

Referring now to FIG. 4, the method 400 may be implemented by the aircraft 100 and FMS 102 and may include the following steps.

At a step 402, the FMS stores to memory a flight plan for execution by the aircraft as well as a navigational database including any approach procedure sets and hybrid approach procedure sets relevant to the flight plan. For example, hybrid approaches may include a first portion executable via a first approach procedure set (e.g., RNP AR) and terminating at a first waypoint (e.g., a final approach fix (FAF)) and a second portion executable via a second approach procedure set (e.g., LPV), to be sequenced at the FAF and terminating at a second waypoint (e.g., landing on the runway, reaching a decision height).

At a step 404, the FMS loads a hybrid approach for execution by the aircraft. For example, the FMS may load a RNP AR-to-LPV hybrid approach including at least one initial RNP AR approach segment (e.g., terminating at the FAF) and one or more final LPV approach segments.

At a step 406, when necessary conditions for arming one or both of the first portion or the second portion are met (e.g., aircraft position within the arming radius), the flight displays may indicate the armed status of the first and/or second portions. For example, the indicators may be textual indicators displayed via a PFD, MFD, navigational display or other flight display. Further, if one portion is armed and another portion is active, the status or mode of both portions may be displayed simultaneously (e.g., the armed and active modes distinguishable via color). In some embodiments, armed status may be indicated via a flight mode annunciator (FMA) of the flight display. In some embodiments, a hybrid approach indicator may indicate an upcoming-armed status of the first or second portion, e.g., indicating that the first or second portion is not yet armed but that arming is imminent. In some embodiments, hybrid approach indicators may indicate when the hybrid approach results in a missed approach.

At a step 408, when necessary conditions for activating the first or the second portion are met (e.g., sequencing the FAF, aircraft position within an activation radius), the flight displays will display hybrid approach indicators indicative of the activated status. If, for example, the first portion is active and the second portion is armed, multi-colored textual indicators may be displayed indicative of the active/armed/status.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims.

Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A flight management system, comprising:
   a memory configured for storage of:
      a flight plan;
      and
      a navigational database comprising a plurality of approach procedure sets, each approach procedure set associated with at least one flight segment, each flight segment connecting two waypoints;
   at least one flight display;
   and
   at least one processor configured to:
      load a hybrid approach comprising:
      a first portion associated with a first approach procedure set, the first portion terminating at a first waypoint;
      and
      at least one second portion associated with a second approach procedure set, the at least one second portion commencing at the first waypoint and terminating at a second waypoint;
and
direct the at least one flight display to display one or more hybrid approach indicators, each hybrid approach indicator indicative of:
an armed status of the first portion or the second portion, when arming conditions for the first portion or the at least one second portion are met;
and
an activated status of the first portion or the second portion, when activation conditions for the first portion or the at least one second portion are met.

2. The flight management system of claim 1, wherein the one or more hybrid approach indicators are textual indicators.

3. The flight management system of claim 1, wherein the one or more hybrid approach indicators include:
a first color associated with the first portion;
and
at least one second color associated with the at least one second portion.

4. The flight management system of claim 1, wherein the one or more hybrid approach indicators include one or more of:
at least one first color associated with an activated status of the first or at least one second portion;
or
at least one second color associated with an armed status of the first or at least one second portion.

5. The flight management system of claim 1, wherein the one or more hybrid approach indicators are indicative of a hybrid approach resulting in a missed approach.

6. The flight management system of claim 1, wherein the one or more hybrid approach indicators are indicative of an upcoming-armed status associated with at least one of the first portion or the second portion.

7. The flight management system of claim 1, wherein the at least one flight display includes a primary flight display (PFD).

8. The flight management system of claim 7, wherein the one or more hybrid approach indicators are displayed via a flight mode annunciator (FMA) of the PFD.

9. The flight management system of claim 1, wherein the one or more hybrid approach indicators are indicative of a navigation system associated with the first portion or the at least one second portion.

10. A method for flight management, the method comprising:
providing, via a flight management system of an aircraft, memory configured for storage of one or more of:
a flight plan of the aircraft;
or
a navigational database comprising a plurality of approach procedure sets, each approach procedure set associated with at least one flight segment, the navigational database including at least one hybrid approach comprising:
a first portion associated with a first approach procedure set, the first portion terminating at a first waypoint;
and
at least one second portion associated with a second approach procedure set, the at least one second portion commencing at the first waypoint and terminating at a second waypoint;

loading, via the flight management system, at least one hybrid approach from the navigational database for execution by the aircraft;
when arming conditions for at least one of the first portion or the at least one second portion are met, displaying, via a flight display of the aircraft, one or more hybrid approach indicators indicative of an armed status of the first portion or the at least one second portion;
and
when activation conditions for at least one of the first portion or the at least one second portion are met, displaying, via the flight display, one or more hybrid approach indicators indicative of an activated status of the first portion or the at least one second portion.

11. The method of claim 10, wherein:
displaying, via a flight display of the aircraft, one or more hybrid approach indicators indicative of an armed status includes displaying one or more textual indicators indicative of the armed status.

12. The method of claim 10, wherein:
displaying, via a flight display of the aircraft, one or more hybrid approach indicators indicative of an activated status includes displaying one or more textual indicators indicative of the activated status.

13. The method of claim 10, wherein:
displaying one or more hybrid approach indicators indicative of an armed status includes displaying one or more hybrid approach indicators associated with a first color indicative of the armed status;
and
displaying one or more hybrid approach indicators indicative of an activated status includes displaying one or more hybrid approach indicators associated with a second color indicative of the activated status.

14. The method of claim 10, wherein displaying one or more hybrid approach indicators indicative of an armed status of the first portion or the at least one second portion includes:
displaying one or more hybrid approach indicators associated with a first color indicative of the first portion;
and
displaying one or more hybrid approach indicators associated with at least one second color indicative of the at least one second portion.

15. The method of claim 10, wherein the one or more hybrid approach indicators are indicative of:
an activated status of the first portion, the activated status associated with a first color;
and
an armed status of a second portion, the armed status associated with a second color.

16. The method of claim 10, wherein the one or more hybrid approach indicators are indicative of a hybrid approach resulting in a missed approach.

17. The method of claim 10, wherein the one or more hybrid approach indicators are indicative of an upcoming-armed status associated with at least one of the first portion or the second portion.

18. The method of claim 10, wherein the at least one flight display includes a primary flight display (PFD).

19. The method of claim 18, wherein the one or more hybrid approach indicators are displayed via a flight mode annunciator (FMA) of the PFD.

20. The method of claim 10, wherein displaying, via a flight display of the aircraft, one or more hybrid approach indicators indicative of an armed status or an activated status of the first portion or the at least one second portion includes:

displaying one or more hybrid approach indicators indicative of a navigation system associated with the first portion or the at least one second portion.

\* \* \* \* \*